United States Patent [19]

Reed et al.

[11] Patent Number: 4,836,999

[45] Date of Patent: Jun. 6, 1989

[54] METHOD FOR CONTROLLING CLAUS FURNACE WITH VARIABLE HYDROCARBON FEED COMPOSITION

[75] Inventors: Robert L. Reed, Houston, Tex.; David A. Holdeman, Tulsa, Okla.

[73] Assignee: Amoco Corporation, Chicago, Ill.

[21] Appl. No.: 175,657

[22] Filed: Mar. 24, 1988

Related U.S. Application Data

[63] Continuation of Ser. No. 891,460, Jul. 29, 1986, abandoned.

[51] Int. Cl.⁴ .............................................. C01B 17/04
[52] U.S. Cl. ................................. 423/574 R; 436/62; 436/121; 436/143
[58] Field of Search ............. 423/574 R; 436/62, 143, 436/121

[56] References Cited

U.S. PATENT DOCUMENTS

| | | | |
|---|---|---|---|
| 2,650,154 | 8/1953 | Anderson | 423/574 R |
| 3,300,282 | 1/1967 | Risk et al. | 436/121 |
| 3,854,876 | 12/1974 | Rankine et al. | 423/574 R |
| 3,871,831 | 3/1975 | Andral et al. | 423/573 |
| 3,985,864 | 10/1976 | Vautrain et al. | 423/574 R |
| 4,100,266 | 7/1978 | Smith et al. | 423/574 R |
| 4,155,987 | 5/1979 | Peterman et al. | 423/574 R |
| 4,390,515 | 6/1983 | Vincent | 423/574 R |
| 4,543,245 | 9/1985 | Peterman et al. | 423/574 R |

OTHER PUBLICATIONS

Beckman Industrial Bulletin 4201C, 1984.

*Primary Examiner*—John Doll
*Assistant Examiner*—Jeffrey E. Russel
*Attorney, Agent, or Firm*—L. Wayne White; Fred E. Hook; Gary M. Bond

[57] ABSTRACT

Oxygen feed to a Claus plant is controlled by calibrating a hydrocarbon-representative response signal, but not a hydrogen sulfide representative response signal, responsive to the ratio of hydrogen sulfide:sulfur dioxide in effluent from the Claus plant.

2 Claims, 1 Drawing Sheet

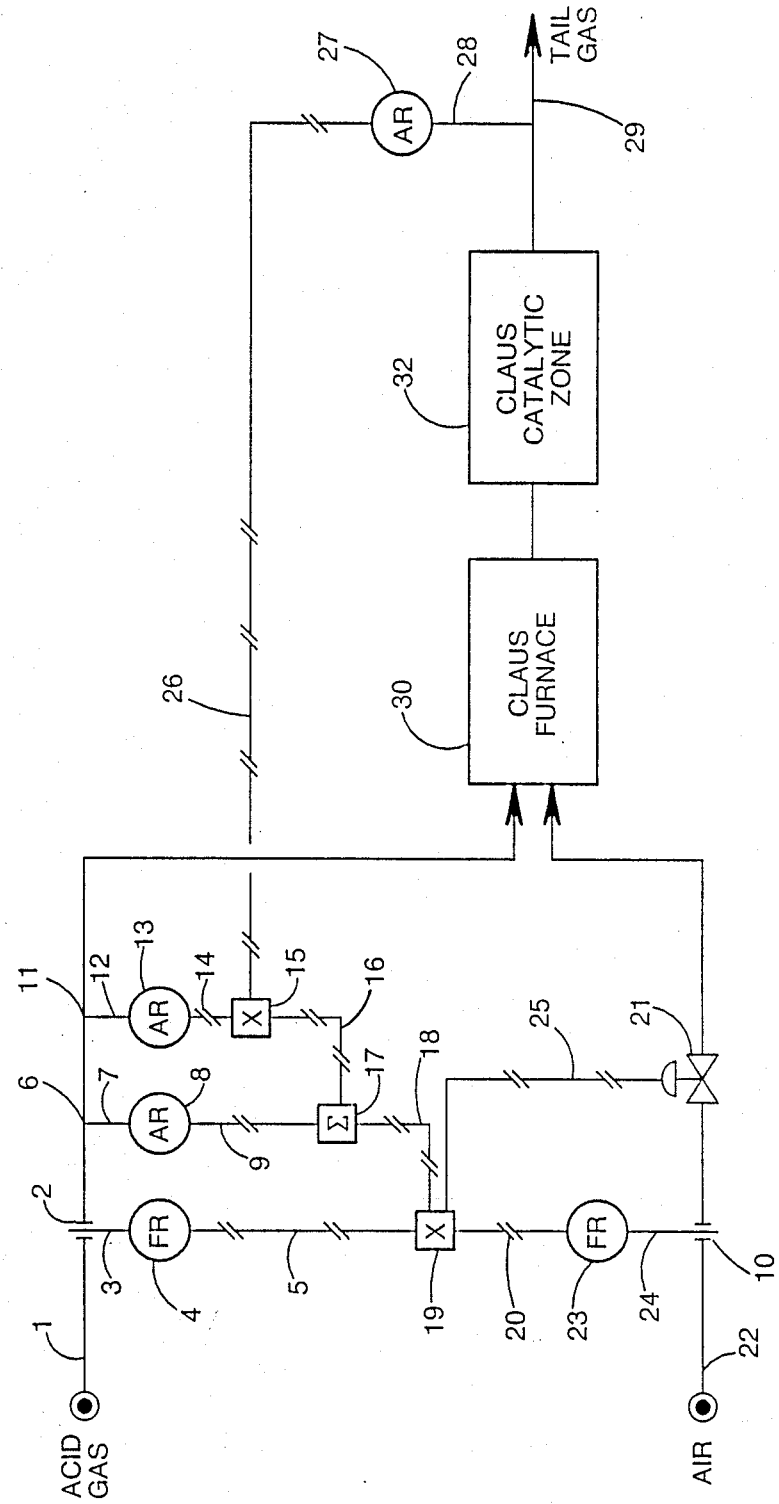

METHOD FOR CONTROLLING CLAUS FURNACE WITH VARIABLE HYDROCARBON FEED COMPOSITION

This is a continuation of copending application Ser. No. 891,460 filed on July 29, 1986, now abandoned.

FIELD OF THE INVENTION

The invention relates to a method for controlling a Claus furnace. In a particular aspect, the invention relates to a method for controlling a Claus furnace responsive to detecting variations in hydrogen sulfide and hydrocarbon concentration and composition in the feed(s) to the furnace. In a further aspect, the invention relates to a method for controlling a Claus furnace in a Claus sulfur recovery plant in which a signal representative of hydrocarbon concentration in feed gases to the furnace is corrected responsive to the composition of effluent from the sulfur recovery plant.

SETTING OF THE INVENTION

The recovery of elemental sulfur from gaseous streams containing hydrogen sulfide is a common industrial process. Such recovery of elemental sulfur can be accomplished by a process according to the following reactions:

$$2H_2S + 3O_2 \rightleftarrows 2H_2O + 2SO_2 \quad (1)$$

($H_2S$ Oxidation)

$$2H_2S + SO_2 \rightleftarrows 3S + 2H_2O \quad (2)$$

(Claus reaction)

$$H_2S + \tfrac{1}{2}O_2 \rightleftarrows S + H_2O \quad (3)$$

(Overall Claus Reaction)

Thus, elemental sulfur can be produced from gaseous streams containing hydrogen sulfide by the Claus process according to reaction (2).

The gaseous stream containing hydrogen sulfide (acid gas) can be provided to the combustion chamber of a furnace where a portion of the hydrogen sulfide can be converted into sulfur dioxide by thermal oxidation in the presence of oxygen or an oxygen containing gas stream. A hot combustion furnace effluent is produced which can contain unreacted hydrogen sulfide, sulfur dioxide, water, formed elemental sulfur and other organic sulfide compounds formed by the reaction with hydrocarbon combustion products where hydrocarbons are present in the acid gas feedstream. The mixture can be passed to one or more catalytic reactors, optionally after passing the mixture through a sulfur condenser for removal of elemental sulfur. In the Claus catalytic reactors, additional sulfur and water can be formed. The gas mixture leaving the condenser can then be reheated and passed to a Claus catalytic reactor where additional elemental sulfur and water can be formed from the reaction of hydrogen sulfide and sulfur dioxide in the presence of an effective Claus catalyst, for example, activated alumina or bauxite. The effluent from each catalytic reactor can be cooled and the elemental sulfur can be removed as condensate. Alternatively, one or more of the catalytic reactors can be operated under conditions, including temperature, effective for depositing a preponderance of sulfur formed on catalyst therein with periodic regeneration of the catalyst as is known in the art.

Close control of the ratio between hydrogen sulfide and sulfur dioxide must be maintained to obtain optimum performance of a sulfur recovery plant. In plants based on the Claus reaction, conversion to elemental sulfur and overall plant recovery is maximized when the ratio of hydrogen sulfide to sulfur dioxide is about 2:1. In some plants, it may be desirable to maintain hydrogen sulfide to sulfur dioxide ratios other than 2:1 at some sacrifice in conversion efficiency and sulfur recovery.

As indicated, a portion of the hydrogen sulfide in the acid gas feedstream can be converted to sulfur dioxide by thermal oxidation. Air is the usual source of oxygen, although air enriched with oxygen or even pure oxygen may be used. The rate of oxygen feed must be controlled to achieve a desired amount of oxidation of hydrogen sulfide to sulfur dioxide If hydrogen sulfide is the only combustible compound in the acid gas feed to the sulfur plant, and if both the acid gas flow rate and combustion are constant, or if changes occur slowly, then control of the air or oxygen can be readily effected by those skilled in the art; thus, the hydrogen sulfide to sulfur dioxide ratio can be maintained at a desired value.

Control of the rate of oxygen feed is made difficult by large variations in composition of the feed to the furnace. The gas feed to the furnace can contain for example, in addition to hydrogen sulfide, other combustible compounds such as aliphatic, olefinic, aromatic, naphthenic, and other hydrocarbons.

The oxygen feed to a Claus sulfur plant can be controlled responsive to analysis of effluent (tail gas) from the plant to determine the hydrogen sulfide to sulfur dioxide ratio. When this ratio deviaes from the desired ratio, an analyzer generates a signal for use in increasing or decreasing the rate of oxygen feed to the furnace of the Claus plant. Variations in the flow rate and composition of the acid gas stream containing hydrogen sulfide and other combustibles such as hydrocarbons and the like result in off-ratio operation until analysis of the resulting effluent gas is completed and a corrected signal is generated. This feedback system, however, results in the Claus plant operating off-ratio and thus inefficiently until effluent representative of a new feed composition to the Claus plant reaches the analyzer and a new control setting is called for.

The oxygen feed to a Claus sulfur plant can also be controlled by analyzing the acid gas feed to the plant and determining the amount of oxygen needed to effect a desired ratio of air to acid gas, and also analyzing the tail gas from the plant to send a corrected signal to adjust the air to acid gas ratio. This type of process control, however, also results in inefficient Claus plant off-ratio operation as it fails to compensate for other combustible compounds in the gas feed to the Claus furnace, such as hydrocarbons, until effluent representative of a new feed gas composition provided to the Claus plant reaches the tail-gas analyzer and a new control setting is called for.

Another method of process control is described in Andral, et al., U.S. Pat. No. 3,871,831 (1975). Andral, et al., regulates the conrrol of gas containing oxygen fed to a unit producing sulfur via oxidation of hydrogen sulfide by generating signals representing the hydrogen sulfide and methane composition of the gas fed to the unit, and by generating a signal representative of the hydrogen sulfide:sulfur dioxide ratio in effluent from the unit.

Andral, et al., specifically disclose the preferential use of gas chromatographs for analysis of both feed gas and effluent gas from the unit. Gas chromatographs, however, are relatively slow analyzers. In this regard, gas chromatographic analysis of the acid gas feed for methane concentration only, as in Andral, et al., considerably shortens the chromatographic analytical response time. By way of comparison, a chromatographic analysis of an acid gas feed to obtain, for example, pentane concentration requires much longer than where the analysis is for methane only. However, methane is not the only possible hydrocarbon in gaseous feedstreams to Claus plants, and it is the heavier hydrocarbons which are usually responsible for air control problems in a furnace.

Acid gas streams can typically contain 1 to 2% methane and smaller amounts of heavier hydrocarbons. For purposes of illustration, assume a particular acid gas contains 0.2% total hydrocarbons heavier than methane, expressed as pentane, plus 1% methane, and, for example, 60% hydrogen sulfide. At steady state, the moles of oxygen required per 100 moles of acid gas are:

| | |
|---|---|
| $H_2S$: | $60\ H_2S + 30\ O_2 \rightarrow 60\ S + 60\ H_2O$ |
| $CH_4$: | $1\ CH_4 + 1.5\ O_2 \rightarrow 1\ CO + 2\ H_2O$ |
| $C_5H_{12}$: | $0.2\ C_5H_{12} + 1.1\ O_2 \rightarrow 1\ CO + 1.2\ H_2O$ |
| Total $O_2$: | $32.6\ O_2$ |

Assuming that the hydrocarbon concentration doubles, without any change in acid gas concentration, and both the air and acid gas flow rates stay constant, then:

| | |
|---|---|
| $CH_4$: | $2\ CH_4 + 3.0\ O_2 \rightarrow 2\ CO + 4\ H_2O$ |
| $C_5H_{12}$: | $0.4\ C_5H_{12} + 2.2\ O_2 \rightarrow 2\ CO + 2.4\ H_2O$ |
| $H_2S$ (By Difference): | $60\ H_2S + 27.4\ O_2 \rightarrow 54.8\ S + 54.8\ H_2O + 5.2\ H_2S$ |
| Total $O_2$: | $32.6\ O_2$ |

Thus, the minor change in hydrocarbon reduces the sulfur recovery by nearly 10% (from 60 moles to 54.8 moles) during the period that oxygen feed is not adjusted. If methane were the only hydrocarbon causing problems, the loss would not be so great (from 50 moles to 57 moles). While there are many other factors to be considered in determining Claus plant sulfur recovery than oxygen feed, this illustrates the large effect on sulfur recovery of a small amount of hydrocarbons in the acid gas, especially those heavier than methane, and further illustrates the significant effect on sulfur recovery of a change in composition of the hydrocarbon components. Thus, it is apparent that rapid adjustment of the oxygen feed to a Claus plant in response to changing feed stream concentration and composition is highly desirable.

It has been suggested to employ an infrared (IR) analyzer on the feedstreams to a Claus plant. (See, for example, Beckman and Company, Industrial Bulletin 4201C, "Models 864/865 Nondispersive Infrared Analyzers" (1984).) Since the IR analyzer responds to carbon-hydrogen bonds, the signal strength from an IR analyzer is proportional to the total amount of carbon hydrogen bonds and therefore to total hydrocarbons and to the amount of oxygen required to combust the total amount of hydrocarbons. An IR online analyzer can also give a rapid response in comparison, for example, to the relatively slow response from a gas chromatographic analyzer. However, if the hydrocarbon composition of the acid gas feedstream varies, the IR analyzer may not give a signal accurately representing the amount of oxygen necessary to combust the hydrocarbons to carbon dioxide or carbon monoxide and water. The reason for this is that although the IR signal is proportional to the number of carbon hydrogen bonds, the amount of oxygen required for combustion will vary not only with the number of carbon hydrogen bonds, but also with the relative proportions of saturated (aliphatic), unsaturated (olefinic), and cyclic (aromatic, naphthenic, etc.) hydrocarbons, all of which have differing carbon-hydrogen ratios.

Accordingly, it is desirable to achieve the advantages of operation obtained by employing analyzers on Claus plant acid gas feedstreams containing hydrogen sulfide and hydrocarbons, and to analyze the feed for hydrocarbon composition, particularly where the composition includes compounds other than methane. It is also desirable to generate a rapid response to adjust the oxygen flow rate into the Claus furnace, and to compensate for the presence of other combustible compounds besides hydrogen sulfide in the Claus furnace. In addition to the above, it is also desirable, when employing an IR analyzer on Claus plant acid gas feedstreams containing hydrocarbons, to adjust the analyzer output to compensate for significant changes in the hydrocarbon composition of the Claus plant acid gas feedstreams.

SUMMARY OF THE INVENTION

In accordance with the present invention, an improved method and apparatus for controlling the production of free sulfur from hydrogen sulfide is provided. A control system is utilized to obtain improved performance from a sulfur plant by controlling the amount of oxygen needed to combust hydrogen sulfide and other combustibles including hydrocarbons varying in concentration and composition in gaseous feedstreams to a Claus furnace.

In accordance with the invention, there is provided a method for controlling a Claus furnace in a sulfur recovery plant comprising such Claus furnace and at least one downstream Claus catalytic reaction zone. In accordance with the invention, the flow rate and concentration of hydrogen sulfide in the feed(s) to the Claus furnace is sensed and a first control signal is produced for controlling the flow of oxygen to the Claus furnace for combusting the hydrogen sulfide and producing a first ratio of hydrogen sulfide to sulfur dioxide in feed to the at least one downstream Claus catalytic reaction zone. A second control signal is then generated for controlling the flow of oxygen to the Claus furnace by steps comprising: (1) generating a first response signal representative of carbon-hydrogen bonds of hydrocarbons in the feed(s) to the Claus furnace; (2) responsive to a second ratio of hydrogen sulfide to sulfur dioxide in effluent from the at least one downstream Claus catalytic reaction zone, the second ratio differing from the first ratio, a second response signal is generated representative of a changed hydrocarbon composition in hydrocarbons in feed(s) to the Claus furnace. Then, the first and second response signals are combined and a third response signal representative of carbon-hydrogen bonds and the changed hydrocarbon composition in the feed(s) to the Claus furnace is generated. A fourth response signal representative of the flow rate of the feed(s) having hydrocarbons therein is also generated and the thus generated fourth response signal is combined with the third response signal for producing the second control signal for controlling the flow of oxygen to the Claus furnace. The flow of oxygen to the Claus furnace is thus controlled responsive to the first control signal and to the second control signal, the second control signal being representative of hydrocarbon concentration and composition.

By practicing the invention, those skilled in the art will appreciate that the signal representative both of carbon-hydrogen bonds and composition of the hydrocarbon in the feed(s) is advantageous where the flow rate increases, but the relative composition of hydrocarbons in the hydrocarbon fraction remains substantially the same because the carbon-hydrogen bond analyzer can then accomplish appropriate adjustment of the oxygen feed to the Claus plant by feed forward control. Where the relative composition changes, an initial adjustment can be made by feed forward control, and then feedback control in accordance with the invention from the tail gas can be utilized to complete adjustment for the change in composition. Thus, by generating a control signal representative of both carbon-hydrogen bonds and the relative composition of hydrocarbons in the feed(s) to the Claus plant in accordance with the invention, more rapid response is achieved even where composition changes; and where composition of hydrocarbons does not change, variations in the hydrocarbon concentration can be compensated for entirely in a feed forward mode, thus decreasing the response time and improving the overall operation of the plant, including the recovery of sulfur therefrom.

Other advantages will be apparent to those skilled in the art from the following description of the drawings and claims.

BRIEF DESCRIPTION OF THE DRAWING

The FIGURE illustrates schematically the invented process.

DETAILED DESCRIPTION OF THE INVENTION

In accordance with the invention, one or more acid gas feedstreams containing hydrogen sulfide and other combustible compounds including a variable hydrocarbon composition can be introduced into the thermal combustion zone of a Claus furnace in the presence of an oxidant such as, for example, air, oxygen enriched air, or pure molecular oxygen. Such feedstreams can be combusted in the furnace, as is known, to produce a hot gaseous effluent stream which can contain formed elemental sulfur, sulfur dioxide, unreacted hydrogen sulfide and other organic sulfide compounds formed where hydrocarbons or carbon dioxide are present in the acid gas.

The Claus furnace which is utilized with the invention can be any suitable furnace such as, for example, a muffle-tube furnace, a fire-tube furnace and the like, which can be selected and designed in accordance with principles familiar to those skilled in the sulfur recovery arts. Combustion of hydrogen sulfide in the furnace can generally be carried out, as is known in the art, for example, at furnace temperatures in the range of about 1800° F. to about 2600° F.

In using the invention, one or more gaseous feedstreams containing hydrogen sulfide are introduced into the thermal combustion zone of a Claus furnace. The feedstreams to the furnace can contain combustible compounds, in addition to hydrogen sulfide, which vary in concentration as well as composition, such as aliphatic hydrocarbons, olefins, aromatics, naphthenics, and other compounds containing carbon-hydrogen bonds such as alcohols, ketones, aldehydes, mercaptans, and the like. Thus, gaseous feedstreams in accordance with the invention can typically contain up to 2% methane and smaller amounts of hydrocarbons heavier than methane. Broadly, the hydrocarbon concentration of the gaseous feedstreams can vary from about 0.5% to about 5%. However, the hydrocarbon concentration is not limited to these ranges.

In accordance with the invention, a first control signal is generated representative of the amount of oxygen required to combust hydrogen sulfide in the feed(s) to the Claus furnace for producing a first ratio of hydrogen sulfide to sulfur dioxide in effluent from the Claus furnace. The flow rate and concentration of hydrogen sulfide in the feeds can be determined by any method known to those skilled in the art. Preferably, the flow rate can be determined, for example, by an orifice meter, or other state-of-the-art equipment, and concentration of hydrogen sulfide can be determined using, on the acid gas feedstream, an ultraviolet (UV) analyzer such as is known to those skilled in this art.

Also in accordance with the invention, a second control signal for controlling the oxygen feed to the Claus furnace can be generated by the following steps. The first response signal representative of carbon-hydrogen bonds of hydrocarbons in the feed(s) to the Claus furnace can be generated. Then, responsive to a second ratio of hydrogen sulfide to sulfur dioxide in effluent from the at least one downstream Claus catalytic reaction zone, the second ratio differing from the first ratio, a second response signal can be generated representative of a change in hydrocarbon composition of hydrocarbons in the feed(s) to the Claus furnace. Then the first and second response signals can be combined and a third signal representative of carbon-hydrogen bonds and the change in hydrocarbon composition in the feed(s) to the Claus furnace can be generated. A fourth response signal representative of flow rate of the feed(s) having hydrocarbons therein can also be generated and combined with the thus generated third response signal representative of carbon-hydrogen bonds and the changed hydrocarbon composition in the feed(s) to the Claus furnace to produce the second control signal for controlling the flow of oxygen to the Claus furnace. Finally, responsive to the first control signal and to the second control signal, the flow of oxygen feed to the Claus furnace can be controlled.

In accordance with the invention, the first response signal representative of carbon hydrogen bonds of hydrocarbons in the feed(s) to the Claus furnace is preferably determined using an infrared analyzer. Hydrocarbon compounds adsorb infrared radiation due to stretching and bending of characteristic bonds such as the carbon-hydrogen bond. The carbon-hydrogen bond strongly absorbs in the 2-4 micron range for saturated, olefinic, and aromatic compounds. The carbon-hydrogen bond stretch region occurs in the region of about 2850 to 2940 cm$^{-1}$. The source can be a broadband infrared source such as a hot wire, a Nernst glower, and the like. The gases flow through the sample flow cell and absorb their characteristic infrared radiation wave length characteristic of the quantity of carbon-hydrogen bonds in the feed(s). The detector can be, for example, of the type consisting of two gas-filled cells, one in an analyzing beam and one in a reference beam, separated by a diaphragm where adsorption of energy results in expansion of the gas which is sensed by a capacitive system. Alternatively, the detector can be of the type consisting of two thermal piles or bolometers, one in each of the two radiation beams, where the absorption of infrared radiation is measured by a differential thermocouple output for a resistant-thermometer (bolometer) grid circuit. Other types of infrared sources and detectors for producing a signal representative of carbon-hydrogen bonds can also be utilized. Further, filters restricting absorption of the infrared radiation to a suitable range can also be used.

A second response signal is generated representative of the hydrocarbon composition in the feed(s) to the Claus furnace. In accordance with the invention, this second response signal is preferably determined by controlling the oxygen flow to the Claus furnace responsive to a signal representative of the amount of oxygen required for combusting hydrogen sulfide and producing a first ratio of hydrogen sulfide to sulfur dioxide in effluent from the Claus furnace. By thus controlling oxygen in response to the hydrogen sulfide in the feed(s) to the Claus furnace, a dvviation from the desired first ratio is representative of a change in hydrocarbon or other combustible composition of the feed(s) to the Claus plant. Thus, a signal representative of a change in hydrocarbon composition in the feed(s) to the Claus furnace can be generated. The signal representative of composition of hydrocarbon in the feed(s) to the Claus furnace can be generated by determining the ratio of hydrogen sulfide to sulfur dioxide in the effluent from the at least one downstream Claus catalytic reaction zone, determining the deviation of the second ratio from the first ratio, and generating a second response signal representative of the deviation of the second ratio from the first ratio.

The first and second response signals can then be combined and a third response signal representative of carbon-hydrogen bonds and the changed hydrocarbon composition in the feed(s) to the Claus furnace can then be generated. Then, by combining the third response signal with a fourth response signal representative of flow rate of the feed(s) having hydrocarbons therein, the second control signal can be produced for controlling the flow of oxygen to the Claus furnace.

By adjusting the output from the infrared analyzer to be representative of flow rate and composition of hydrocarbons in feed(s) to the Claus furnace significant advantages are obtained. For example, where the composition remains stable but the flow rate or concentration changes, adjustment in the control can be by the feed forward mechanism which offers significant advantage in response time. Even where the composition changes, a portion of the change of composition will be sensed in the feed forward control and a final adjustment can be made by feed back control from the determination of the ratio of hydrogen sulfide to sulfur dioxide in the effluent from the at least one downstream Claus catalytic reaction zone.

The process according to the invention can further include a first microprocessor means to receive the first and second response signals representative of the carbon-hydrogen bonds in the hydrocarbon feed(s) to the furnace and also representative of the hydrogen sulfide and sulfur dioxide in effluent from the furnace, and to generate from the first and second response signals the third response signal representative of carbon-hydrogen bonds and the changed hydrocarbon composition in the feed(s) to the furnace.

Another microprocessor means can also be included to receive the first and second control signals and produce an output control signal using a specific regulating algorithm adapted to the dynamics of the unit as is known to those skilled in the art. The output control signal represents the flow rate of oxygen containing gas to the furnace necessary to maintain the instantaneous level of the ratio of hydrogen sulfide to sulfur dioxide in the furnace at a desired ratio. The output control signal can then, for example, operate a servomechanism to adjust the setting of an air inlet valve thereby controlling the flow rate of oxygen containing gas to the furnace.

In one aspect of the invention, the effluent stream from the Claus furnace can be cooled to a temperature in the range of from about the sulfur condensation point to about 700° F., preferably in the range of about 350° F. to about 575° F., and can be introduced into one or more Claus catalytic reaction zones in the presence of a catalyst for facilitating the Claus reaction (2). In the presence of such catalyst, the hydrogen sulfide and sulfur dioxide remaining in the gaseous stream can be further converted to elemental sulfur and an effluent stream containing elemental sulfur in a vapor stage, as well as unreacted hydrogen sulfide and sulfur dioxide can be produced which can be provided to a sulfur condenser where such effluent stream is cooled, for example to about 260° F., and elemental sulfur can be removed therefrom in the liquid state to produce a sulfur-lean Claus catalytic reaction zone effluent stream. A second response signal representative of the hydrogen sulfide and sulfur dioxide concentration in the Claus catalytic reaction zone effluent stream can then be generated, in accordance with the invention, and provided to the first microprocessor means along with the first response signal representative of the carbon-hydrogen bonds in the hydrocarbons in the feed(s) to the Claus furnace to generate the third response signal representative of the changed hydrocarbon composition in feed(s) to the Claus furnace.

The resulting sulfur-lean Claus catalytic reaction zone effluent stream can be introduced without heating into a second Claus catalytic reaction zone at temperatures such that a predominant portion of the produced elemental sulfur is deposited on the catalyst. Such a process is preferably the Claus cold bed absorption (CBA) process, although other such processes may be used in accordance with the invention. In the CBA process, further Claus catalytic conversion occurs which further reduces the level of sulfur compounds in the effluent stream therefrom. The CBA reaction zone can be operated under conditions of temperature such that sulfur deposition occurs, preferably in the range of about 250°–330° F. In accordance with the invention, the second response signal representative of the hydrogen sulfide and sulfur dioxide concentration in the effluen from the CBA process can then be generated, and provided to the first microprocessor means along with the first response signal representative of the carbon-hydrogen bonds in the feed(s) to the Claus furnace to generate the third response signal representative of the changed hydrocarbon composition in the feed(s) to the Claus furnace. The Claus catalytic reaction effluent stream can alternatively be provided to other known Claus plant tail gas cleanup processes a further sulfur removal. In such event, the hydrogen sulfide-sulfur dioxide analysis can occur upstream of such a tail gas cleanup unit.

DETAILED DESCRIPTION OF THE DRAWING

The invention will be further understood and appreciated from the following detailed description, illustrated by the accompanying FIGURE, without being in any way confined to this embodiment.

The FIGURE shows schematically, a Claus plant including a thermal reactor (furnace 30) and a Claus catalytic zone 32.

Referring now in detail to the FIGURE, gaseous feed streams containing hydrogen sulfide (acid gas streams), and which also contain methane and heavier hydrocarbons, are fed by conduit means 1 to furnace 30. A sample of effluent from the tail gas 29 passes through a conduit means 28 to an ultraviolet analyzer 27 where the hydrogen sulfide and sulfur dioxide concentration of the furnace effluent is measured and a signal representative of such is fed by line 26 to a first microprocessor means 15. The sample inlet device on analyzer 27 can be an adjustable inlet tap which is placed in a heated insulated enclosure, the temperature of which is above the solidification point of sulfur.

A sampling device 11, connected to conduit means 1, takes a sample of the acid gas feedstream. This sample passes along a conduit means 12 to an infrared analyzer 13. Analyzer 13 measures the carbon-hydrogen bond concentration of the acid gas feedstreams fed to furnace 30 and a signal representative of such is then provided by line 14 to microprocessor means 15 where said signal is corrected in response to the signal provided by line 26 to the first microprocessor means 15 which represents the hydrogen sulfide and sulfur dioxide concentration in the furnace effluent, thus compensating for significant changes of hydrocarbon concentration in the acid gas feedstreams. The corrected signal representative of the total hydrocarbon concentration of the acid gas feedstreams is then provided by line 16 to a signal summing means 17.

A sampling device 6, connected to conduit means 1 also takes a sample of the acid gas feedstreams fed to furnace 30. This sample passes along conduit means 7 to an ultraviolet analyzer 8 where the hydrogen sulfide concentration of the acid gas feed streams fed to furnace 30 is measured. A signal representative of such is then provided by line 9 into signal summing means 17. A combined signal representative of the corrected total hydrocarbon concentration and composition in the acid gas feedstream to furnace 30 and the hydrogen sulfide concentration of said feedstreams is then provided by line 18 to a second microprocessor means 19.

A signal representing the flow rate of acid gas streams fed to furnace 30 obtained by a suitable device such as orifice meter 2 is provided by line 3 to flow sensor 4 and then by line 5 to the second microprocessor means 19 which in conjunction with the combined signal provided by line 18 to the second microprocessor means is then used to determine a control signal representative of the flow rate of oxygen containing gas to furnace 30 needed to maintain the ratio of hydrogen sulfide to sulfur dioxide in said furnace at an instantaneous operating parameter.

Oxygen-containing gas can be provided by conduit means 22 on which is fitted a flow meter or recorder 23 to which a signal is provided by orifice meter 10 and line 24. The signal representative of oxygen flow is provided to the second microprocessor means 19 by line 20. From microprocessor 19, another signal representative of the value of the control signal is provided by line 25 to a valve 21 which controls the flow rate of oxygen-containing gas to the furnace 30.

EXAMPLE - FEEDBACK CONTROL RESPONSIVE TO HYDROCARBON COMPOSITION CHANGES

The principles underlying the invention can be further understood and appreciated by considering a typical condition where both hydrogen sulfide and hydrocarbons are present in the acid gas feedstream to the Claus furnace. In such a case, as illustrated in the FIGURE, the acid gas volume $V_{ag}$ can be sensed by orifice meter 2 and flow recorder 4; the flow rate of air (molecular oxygen) can be sensed by orifice meter 10 and flow recorder 23; the hydrogen sulfide concentration $[H_2S]$ can be measured by ultraviolet analyzer 8; the carbon-hydrogen bond concentration $[C-H]$ can be measured by infrared analyzer 13; and the hydrogen sulfide and sulfur dioxide in the tailgas line 29 can be measured by ultraviolet analyzer 27. The output signal from the tailgas ultraviolet analyzer 27 can then be sent as a linear relationship $\{[SO_2]-\frac{1}{2}[H_2S]\}$ to microprocessor 15, which also receives the carbon-hydrogen bond concentration $[C-H]$ from infrared analyzer 13. Then, the oxygen demand will be proportional to $$V_{ag}\{[H_2S]+K'[C-H]\}$$

where $K'$ is a correction factor applied to the infrared analyzer output 14 based on an excess or deficiency of $SO_2$ in the tailgas line expressed as a linear signal from the tailgas analyzer 27 provided by line 26 to microprocessor 15. From the above equation, it will be appreciated that the correction factor scales (is multiplied with) the infrared analyzer output, but not the ultraviolet analyzer 8 output. It will be appreciated that $K'$ will be proportional to the change in the ratio of hydrogen sulfide to sulfur dioxide in the tail gas from the Claus catalytic reaction zone 32 due to hydrocarbon composition changes, that is, where the desired hydrogen sulfide:sulfur dioxide ratio is 2:1, $K'$ will be proportional to $\{[SO_2]-\frac{1}{2}[H_2S]\}$ which is the signal provided by tail gas analyzer 27.

Air flow rate control presents no problem if the acid gas flow rate and the acid gas composition are constant. Adjustment, however, is required when one or more of the following occurs:

(1) acid gas flow rate, $V_{ag}$ changes;
(2) hydrogen sulfide concentration [H2S]changes;
(3) hydrocarbon concentration of the acid gas changes, but the distribution of the hydrocarbon compounds within the hydrocarbon fraction is unchanged;
(4) composition of the hydrocarbon fraction of the acid gas changes even though the hydrocarbon concentration (percent hydrocarbon) may not change.

As illustrated in the FIGURE, the air (oxygen) flow valve 21 can be controlled by a combination of signals from the acid gas flowmeter 4 and the two acid gas analyzers 8 and 13. The signal from at least one of these analyzers 8 and 13 can be reset by the signal from the tail gas ultraviolet analyzer 27. Therefore, for each of the occurrences (1)-(4), consideration of two base cases will suffice:

(A) the signal from the tail gas ultraviolet analyzer 27 calibrates (resets) the acid gas ultraviolet analyzer 8;

(B) the signal from tail gas ultraviolet analyzer 27 calibrates (resets) the acid gas infrared analyzer 13 only.

Those skilled in the art will recognize that for changes in the acid gas flow rate, changes in $H_2S$ concentration, and changes in hydrocarbon concentration but not composition, it makes little or no difference whether the signal from the tailgas ultraviolet analyzer 27 calibrates the acid gas ultraviolet analyzer 8 or the acid gas infrared analyzer 13. However, where the composition of the hydrocarbon fraction changes, even though the total hydrocarbon concentration does not change, it is required in accordance with the invention that the signal from tailgas analyzer 27 calibrate the acid gas infrared analyzer 13. The advantages can be seen from the following cases:

CASE 1—EFFECT OF HYDROCARBON COMPOSITION CHANGE WHERE ANALYZER 27 RESETS ANALYZER 8

In this case, the hydrocarbon concentration of the acid gas does not change, but the distribution of the hydrocarbons (composition) within the hydrocarbon fraction changes and the tail gas ultraviolet analyzer 27 calibrates the signal from the acid gas ultraviolet analyzer 8. For illustrative purposes, the plant operation is considered to be stable and to be processing an acid gas having the following composition:

| Acid Gas Composition A: | |
|---|---|
| $H_2S$ | 70.00% |
| $CO_2$ | 24.00% |
| $H_2O$ | 3.00% |
| $CH_4$ | 1.50% |
| $C_2H_6$ | 0.60% |
| $C_2H_4$ | 0.40% |
| $C_3H_8$ | 0.20% |
| $C_3H_6$ | 0.10% |
| $C_4H_{10}+$ | 0.20% |
| (3.0% Hydrocarbon) | |

Then, the acid gas composition (but, for illustrative purposes, not the rate) changes to the following:

| Acid Gas Composition B: | |
|---|---|
| $H_2S$ | 70.00% |
| $CO_2$ | 24.00% |
| $H_2O$ | 3.00% |
| $CH_4$ | 1.00% |
| $C_2H_6$ | 0.70% |
| $C_2H_4$ | 0.50% |
| $C_3H_8$ | 0.30% |
| $C_3H_6$ | 0.20% |
| $C_4H_{10}+$ | 0.30% |
| (3.0% Total Hydrocarbon) | |

Thus, both acid gas compositions contains the same concentration (percentage) of hydrocarbons, but the composition of the hydrocarbon fraction differs. The change from composition A to composition B will require that more oxygen be provided to the furnace to combust the hydrocarbons to carbon dioxide since the total number of carbon-hydrogen bonds has increased. The acid gas infrared analyzer 13, which detects primarily the C—H single bonds will detect an increase, but because of the hydrocarbon composition change, the signal from the infrared analyzer 13 will not initially be proportional to the air rate required. In this event, the $H_2S:SO_2$ ratio in the tail gas will depart from the desired ratio, for example, 2:1. It can be set on ratio again by the tail gas ultraviolet analyzer 27 adjusting the air rate by calibrating the signal from the acid gas ultraviolet analyzer 8. However, this is disadvantageous in that the tail gas ultraviolet analyzer 27 would be recalibrating the acid gas ultraviolet analyzer 8 so that a given measured amount of $H_2S$ would correspond to a different air rate. Then, if later, a change in the $H_2S$ concentration of the acid gas occurs, the ultraviolet analyzer 8 would change the air rate, but the change would not be correct because of the changed calibration, so the plant will again be off ratio until the tail gas ultraviolet analyzer again corrects the air rate.

Similarly, if the change from acid gas composition A to acid gas composition B as described above occurs, and the tail gas ultraviolet analyzer 27 adjusts the air rate by calibrating the signal from the acid gas ultraviolet analyzer 8, and then a change in the acid gas hydrocarbon concentration occurs (for illustrative purposes, assuming no change in the composition of the hydrocarbon fraction), the acid gas infrared analyzer 13 will change the air rate. However, the air rate change will not maintain the $H_2S:SO_2$ ratio at the desired ratio since the infrared analyzer 13 was calibrated according to the previous hydrocarbon composition (that is, acid gas composition A), and changes in the air rate are based on this composition. Therefore, the plant would again be operated off ratio until the tail gas ultraviolet analyzer 27 can again correct the air rate. Thus, providing a signal from tail gas analyzer 27 to calibrate ultraviolet analyzer 8 leads to an iterative searching for the desired air rate when these changes occur in the acid gas concentration.

CASE 2—EFFECT OF HYDROCARBON COMPOSITION CHANGE WHERE ANALYZER 27 CALIBRATES ANALYZER 13

In this case also, the hydrocarbon concentration of the acid gas does not change, but the distribution of the hydrocarbons (composition) within the hydrocarbon fraction changes. However, unlike Case 1, the tail gas ultraviolet analyzer 27 calibrates the signal from the acid gas infrared analyzer 13. The change from acid gas composition A to acid gas composition B is as described above. This change will again require more oxygen be provided to the furnace. The acid gas infrared analyzer 13, which detects primarily the C—H single bonds will detect an increase, but because of the hydrocarbon composition change, the signal from the infrared analyzer 13 will not initially be proportional to the air rate required. In this event, again the $H_2S:SO_2$ ratio in the tail gas will depart from desired ratio. The ratio is reset to the desired ratio, for example, 2:1, by the tail gas ultraviolet analyzer 27 adjusting the air rate by calibrating the signal from the acid gas infrared analyzer 13. This is, in essence, recalibrating the acid gas infrared analyzer for the new hydrocarbon composition. Consider now the two cases considered in Case 1 above. If, after the change in hydrocarbon fraction composition, a change in the $H_2S$ concentration of the acid gas occurs, the ultraviolet analyzer 8 will change the air rate. Because the acid gas ultraviolet analyzer 8 signal has not been modified, it is still proportional to the amount of air required by the H$_2$S, so that the air rate can change in response to ultraviolet analyzer 8 without changing the H$_2$S:SO$_2$ ratio in the tail gas. Therefore, iterative correction from the tail gas analyzer 27 is not required. Similarly, if the change from acid gas composition A to acid gas composition B as described above occurs and the tail gas ultraviolet analyzer 27 adjusts the air rate by calibrating the signal from the acid gas infrared analyzer 13, and then a change in the acid gas hydrocarbon concentration occurs (assuming for illustration purposes, no change in composition of the hydrocarbon fraction), the acid gas infrared analyzer will change the air rate as required based on the hydrocarbon composition of the new acid gas (acid gas composition b), as the tail gas ultraviolet analyzer has recalibrated it for the new composition. Again, the plant will continue to operate on ratio and no further modification of the acid gas analyzers 8 or 13 by the tail gas ulraviolet analyzer 27 should be required. Thus, it is apparent that the signal from tail gas analyzer 27 should be used to calibrate or reset the output of analyzer 13 rather than of analyzer 8.

While the invention has been described in terms of the presently preferred embodiment, reasonable variations and modifications are possible, by those skilled in the art of sulfur recovery, within the scope of the described invention and the appended claims.

What is claimed is:

1. A method for controlling the flow of oxygen feed to a Claus furnace in a sulfur recovery plant comprising a Claus furnace and a Claus catalytic reaction zone, said method comprising:

generating a first control signal by means sensing flow rate of a gaseous feed(s) containing hydrogen sulfide to the Claus furnace wherein hydrogen sulfide is combusted to produce a first molar ratio of hydrogen sulfide to sulfur dioxide in feed to the Claus catalytic reaction zone;

generating a second control signal representative of carbon-hydrogen bonds and composition of the hydrocarbons in the feed(s) to the Claus furnace by steps comprising:

(1) generating a first response signal representative of carbon-hydrogen bonds of hydrocarbons in the hydrogen sulfide feed(s) to the Claus furnace;

(2) responsive to a second molar ratio of hydrogen sulfide to sulfur dioxide in effluent from the Claus catalytic reaction zone, the second ratio differing from the first ratio, generating a second response signal representative of a changed hydrocarbon composition of hydrocarbons in feed(s) to the Claus furnace; and (3) combining the first and second response signals by means generating a third response signal representative of carbon-hydrogen bonds and the changed hydrocarbon composition in the feed(s) to the Claus furnace;

(4) generating a fourth response signal representative of concentration of hydrogen sulfide in the hydrogen sulfide feed(s); and (5) combining the fourth response signal with the third response signal by means producing the second control signal; and by means responsive to the first control signal and to the second control signal, controlling the flow of oxygen feed to the Claus furnace to sustain the Claus reaction in the Claus furnace and maintain the second molar ratio of hydrogen sulfide to sulfur dioxide of about 2 to 1.

2. The method of claim 1 further comprising:

generating the first response signal representative of carbon-hydrogen bonds by irradiating a portion of the feed(s) containing hydrocarbons with a source of infrared radiation, and detecting absorption in at least the 2 to 4 micron range of wave lengths; and generating the second response signal using an ultraviolet analyzer and detecting the amount of hydrogen sulfide and the amount of sulfur dioxide in the tail gas from at least one downstream Claus catalytic reaction zone.

* * * * *